United States Patent [19]

Nelson et al.

[11] Patent Number: 5,859,695

[45] Date of Patent: Jan. 12, 1999

[54] METHOD OF AND SYSTEM FOR CHARACTERIZATION OF FIBER OPTIC CONNECTIONS IN SITU

[75] Inventors: Larry A. Nelson, Bellevue, Wash.; James W. Woods, Albuquerque, N. Mex.

[73] Assignee: Honeywell Inc., Minneapolis, Minn.

[21] Appl. No.: 996,844

[22] Filed: Dec. 23, 1997

[51] Int. Cl.$^6$ .................................................. G01N 21/88
[52] U.S. Cl. .......................................................... 356/73.1
[58] Field of Search ............................................. 356/73.1

[56] References Cited

U.S. PATENT DOCUMENTS

| | | | |
|---|---|---|---|
| 4,838,690 | 6/1989 | Buckland et al. | 356/73.1 |
| 5,251,001 | 10/1993 | Dave et al. | 356/73.1 |
| 5,621,517 | 4/1997 | Jezwinski et al. | 356/73.1 |

*Primary Examiner*—Vincent P. McGraw
*Attorney, Agent, or Firm*—Andrew A. Abeyta

[57] ABSTRACT

A test method and system for the testing of fiber optic connectors in a fiber optic system while the system is operational without external test equipment. An input signal is applied to one end of a fiber optic path comprising a plurality of connections, which results in an output signal. The input signal has known characteristics (e.g., a training pulse) over the fiber optic path. The output signal, which is generated in response to the input signal, is converted from a time domain expression to a frequency domain expression using, for example, Fourier transform analysis. Then, the frequency domain expression of the output signal is combined with a frequency domain expression of the input signal to provide a waveform from which the location of each connector and its relative level of performance can be determined. Advantageously, the method and system do not require disassembly of the fiber optic path.

21 Claims, 4 Drawing Sheets

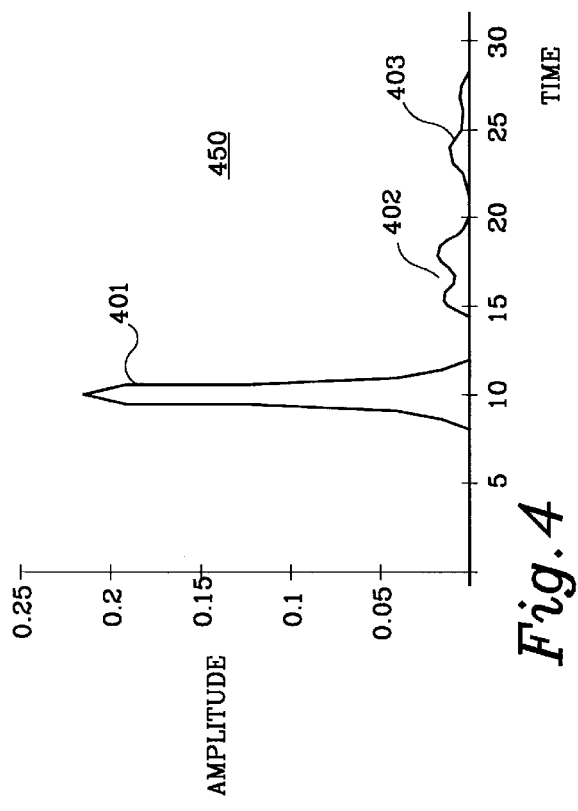
Fig. 4
Fig. 3
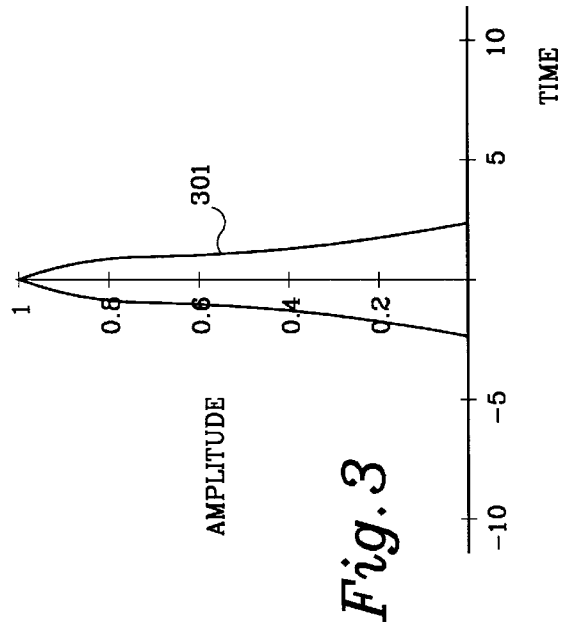
Fig. 6
Fig. 5

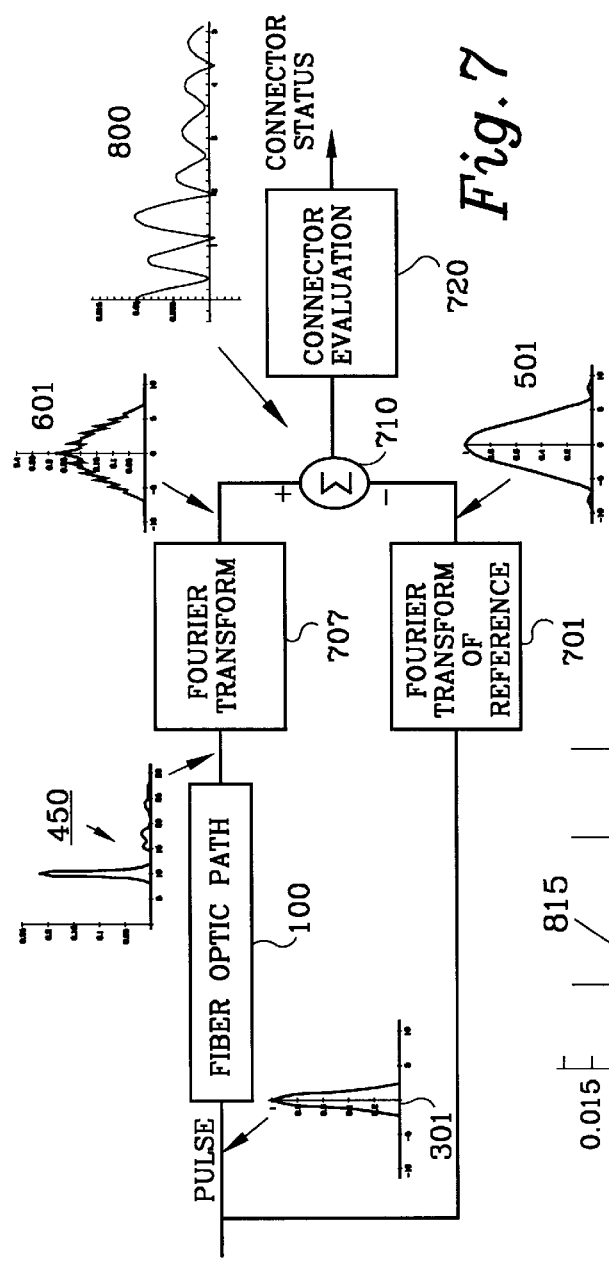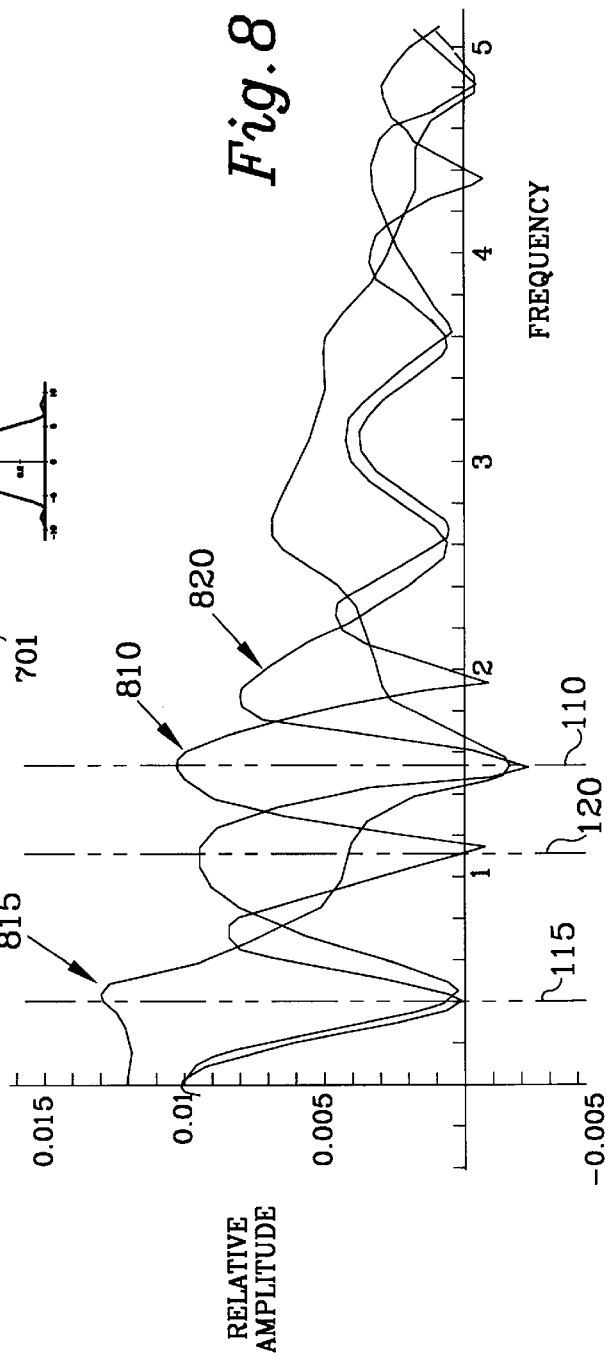

METHOD OF AND SYSTEM FOR CHARACTERIZATION OF FIBER OPTIC CONNECTIONS IN SITU

I. CROSS-REFERENCE TO RELATED APPLICATIONS

Not applicable

II. BACKGROUND OF THE INVENTION

The present invention relates generally to the field of test methods and systems. More specifically, the present invention relates generally to a method and system for in situ testing of the performance characteristics of fiber optic cable assemblies and components.

Prior to the present invention, isolation of failures in fiber optic systems, such as those found aboard aircraft, have been impossible without complete removal of fiber optic cables, fiber optic connectors, and other components. Thus, in light emitting diode ("LED") based fiber optic transmission systems, for example, the effect of reflections due to fiber optic connectors are often ignored. Similar to electrical transmission systems, reflections in fiber optical transmission systems distort the transmitted signals and impair the system's ability to transfer information. The level of impairment depends on the amplitude of the reflections, the delay between reflections, and the attenuation in the transmission media between reflection sources. Attenuation in a transmission path reduces the amplitude of reflections and thus their effect. Therefore, reflections in a fiber optic transmission system have a more significant impact on system performance because of the extremely small amount of attenuation (e.g., on the order of 0.5-dB per kilometer) in transmission paths between connectors.

In military avionics applications, a typical fiber optic transmission path contains many connections. These connections typically occur in mass terminated connectors (e.g., MIL-C-38999 insert connectors) which contain many other types of connections, such as wires of different sizes and coaxial connections. The poor performance of these types of fiber optic connectors severely impairs the performance of fiber optic transmission systems. Historically, connectors have been a source of intermittent system failures. Because, prior to the present invention, there was no method of measuring a connector's performance level or isolating link problems to a particular connector in multiple connector systems, periodic maintenance is performed on every connector in an aircraft.

A maintenance action includes disconnecting a connection, cleaning the ends of the fiber with a solvent, and reconnecting the fiber. Aside from injecting cost into the picture, these maintenance actions were often ineffective or created connections with poor performance.

III. BRIEF SUMMARY OF THE INVENTION

The following summary of the invention is provided to facilitate an understanding of some of the innovative features unique to the present invention, and is not intended to be a full description. A full appreciation of the various aspects of the invention can only be gained by taking the entire specification, claims, drawings, and abstract as a whole.

In accordance with the principles of the present invention, the performance of fiber optic connectors within a fiber optic transmission path is determined. The location of connectors that are performing poorly or below standard, is determined without dismantling the system.

In order to measure the performance of each connector, knowledge of the system layout must be obtained. This knowledge includes the number of connectors, the distance between each connector, and the nominal performance of the connectors. Using this information, the link or fiber optic path is analyzed to determine the particular characteristic frequency associated with each connector and the nominal energy level expected at each of these frequencies.

Once the path characteristics are known, connector performance is determined by injecting a reference input signal or test pulse having known characteristics into a fiber optic transmission path and analyzing the resultant output signal. Analysis is performed by subtracting the frequency domain expression, e.g., Fourier transform, of the resultant output signal from the frequency domain expression, e.g., Fourier transform, of the reference input signal and monitoring the energy level at each particular characteristic frequency as determined by the analysis. For example, as a particular connector's performance degrades, the energy at a unique frequency will increase.

The ability to characterize the performance of each connector allows localization of faults or other undesired effects within a fiber optic transmission path. Knowing the location of connectors within a fiber optic transmission path that are performing poorly or have actually failed allows maintenance to be directed to the exact cause of the failure.

The ability to measure the performance of individual fiber optic connectors within a fiber optic transmission path allows each connector to be monitored and its performance logged. Once monitored and logged, it is possible to determine how individual connectors are performing over time and, in the case of aircraft, over aircraft operating parameters such as altitude, speed, acceleration, pitch, roll, and yaw. This information can be used to aid in aircraft wiring and cable design.

The connector performance can be characterized as a function of mechanical or environmental stresses on the fiber optic system such as those encountered by operating an aircraft at various altitudes, speed, acceleration, pitch, roll, and yaw. With this information, it is possible to isolate problems with fiber optic cable routing and connectorization associated with a particular aircraft design because these problems are more likely to occur when the aircraft is in flight.

The novel features of the present invention will become apparent to those of skill in the art upon examination of the following detailed description of the invention or can be learned by practice of the present invention. It should be understood, however, that the detailed description of the invention and the specific examples presented, while indicating certain embodiments of the present invention, are provided for illustration purposes only because various changes and modifications within the spirit and scope of the invention will become apparent to those of skill in the art from the detailed description of the invention and claims that follow.

IV. BRIEF DESCRIPTION OF THE DRAWINGS

The accompanying figures, in which like reference numerals refer to identical or functionally-similar elements throughout the separate views and which are incorporated in and form part of the specification, further illustrate the present invention and, together with the detailed description of the invention, serve to explain the principles of the present invention.

FIG. 3 illustrates an input signal, amplitude versus time, applied to the path of FIG. 1;

FIG. 4 illustrates the resulting output signal, amplitude versus time, at the receiving end of the fiber optic transmission path;

FIG. 5 illustrates the Fourier transform of the input signal of FIG. 3;

FIG. 6 illustrates the Fourier transform of the output signal of FIG. 4;

FIG. 7 illustrates a test system in functional block form in accordance with the principles of the present invention;

FIG. 8 illustrates waveforms, relative amplitude versus frequency, produced in the test system of FIG. 7.

V. DETAILED DESCRIPTION OF THE INVENTION

Figure 1:
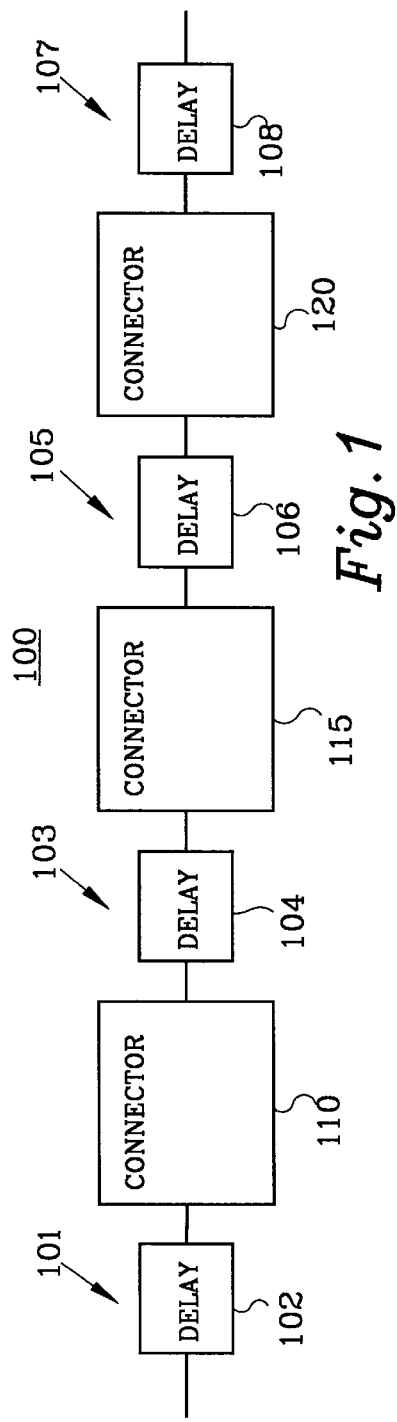
FIG. 1 illustrates a fiber optic transmission path to which the present invention is advantageously applied.

FIG. 1 illustrates a fiber optic transmission path 100 in a fiber optic system (not shown). The fiber optic transmission path 100 includes a certain number of operative transmission links. In FIG. 1, four fiber optic transmission links, 101, 103, 105, and 107 are illustrated as a non-limiting example (i.e., more transmission links are possible). Associated with each link of the fiber optic transmission path 100, is a corresponding propagation delay 102, 104, 106, and 108. The system shown includes three connectors 110, 115, and 120 as a non-limiting example. Associated with each of these connectors 110, 115, and 120 are a reflection coefficient ("R") and a transmission coefficient ("T"). The reflection coefficients for connectors 110, 115, and 120 are R1, R2, and R3, respectively. The transmission coefficients for connectors 110, 115, and 120 are T1, T2, and T3, respectively. It is important to note that energy is conserved In fiber optic connectors and optical fibers. Therefore, energy that is not transmitted (e.g., loss) is reflected, which enables the present invention to operate based on this principle.

Figure 2:
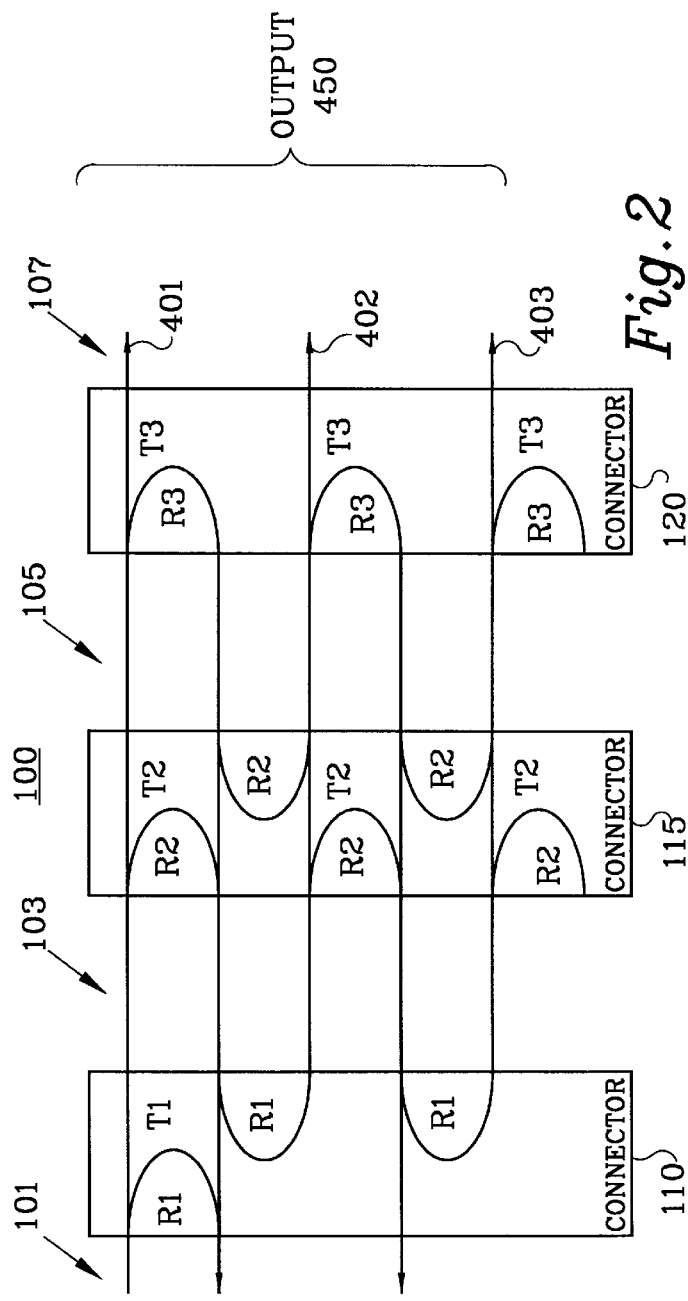
FIG. 2 illustrates a signal flow diagram of the fiber optic transmission path of FIG. 1.

Referring now to FIG. 2, a signal flow diagram for the fiber optic transmission path 100 of FIG. 1 is shown. Although fiber optic transmission paths, such as the one shown in FIG. 1, are bi-directional, for purposes of the operational description presented herein, it is assumed for ease of illustration and not by limitation, that input signals are introduced at the left side of FIGS. 1 and 2 and that output signals exit from the system on the right side of FIGS. 1 and 2. It should be understood by those skilled in the art that signals can be injected other than at the left sides. A signal input on the left of FIG. 2 results in an infinite number of output signals, including output signals 401, 402, and 403, each arriving at a particular instant in time determined by multiples of the various propagation delays in fiber optic transmission path 100. The actual output 450 of the fiber optic transmission path 100 is the sum of all these output signals, which can be polar opposites, including output signals 401, 402, and 403. For purposes of this discussion only and not by way of limitation, only the first three output signals (401, 402, and 403) in time are considered. The remaining output signals are very small.

An input signal or pulse 301, which is exemplarily shown as a cosine squared function in FIG. 3 but not limited to this type of signal, is applied to one end of the fiber optic transmission path 100. The output signal 450 resulting from the other end of the fiber optic transmission path 100 is shown in FIG. 4. Waveform portions 401, 402, and 403 of FIG. 4 correspond to the output signals 401, 402, and 403 shown in FIG. 2.

Referring to FIG. 5, there is shown a Fourier transform 501 that is produced from the input signal 301 that is shown in FIG. 3. The Fourier transform is conducted in a manner well known to those skilled in the art. The Fourier transform is a mathematical tool that is used to expand signals into a spectrum of sinusoidal components to facilitate signal analysis and system performance; it is one of the more common processes for determining the spectrum of a signal. Classical Fourier processes include Fourier series and Fourier integral analysis for continuous time signals and systems and other methods for discrete signals analysis. The Fourier transform is used in this embodiment because it provides a useful translation from an expression in the time domain to the frequency domain where reflections cause a ripple in the frequency response indicative of the location of a connector. Although this embodiment of the present invention is introduced through the use of Fourier transforms to convert signals to another domain that for connector analysis, those skilled in the art will recognize that other forms of analysis can be used instead to provide the same or other information, and the present invention is not limited to Fourier transforms. Furthermore, the determination of spectral composition of these signals is not limited to a mathematical analysis. The determination of spectral composition of these signals can be accomplished by physical apparatus, such as a spectrum analyzer or receiver apparatus. In addition, mathematical analysis using kernels that are not sinusoidal can be used (e.g., wavelet transforms).

Referring to FIG. 6, there is shown a Fourier transform 601 that is produced from the resulting output signal 450 that is shown in FIG. 4. By comparing the output signal spectrum of Fourier transform 601 shown in FIG. 6 to the input signal spectrum of Fourier transform 501 shown in FIG. 5, it is apparent that reflections caused by connectors 110, 115, and 120 create amplitude mis-equalization in the frequency domain. Analysis of the amplitude mis-equalization (both amplitude and interval) provides information on the location and magnitude of the reflections. More specifically, amplitude peaks or nulls occurring at specific frequencies can be used to identify the location and characteristics of connectors along the fiber optic transmission path 100. Of the physical parameters of the fiber optic transmission path, the specific frequencies are of particular importance in determining the location of the faulty connections. Other parameters of the fiber optic transmission path can be used in accordance with the present invention.

Referring now to FIG. 7, a functional block diagram illustrating the principles of the present invention is shown. A non-limiting example of a fiber optic transmission path 100 under test is that shown in FIG. 1 and includes three connectors 110, 115, and 120 each having a known spacing or distance apart. A commercially-available optical source provides a reference input signal 301, which has known characteristics, to the input of the fiber optic transmission path 100 as illustrated in FIG. 2. In parallel, a Fourier transform 501 is produced in Fourier transform of reference block 701 from the reference input signal 301 (also shown in FIG. 3). There must be some transmission of light for the present invention to be able to locate faulty connections. The output signal 450 of the fiber optic transmission path 100 is generated at the output of fiber optic transmission path 100. A Fourier transform 601 is produced in Fourier transform block 707 from the resulting output signal 450 (also shown in FIG. 4). A comparator 710 compares the Fourier transform 601 of output signal 450 to the Fourier transform 501 of input signal 301, which is scaled for link attenuation. In practice, the Fourier transform 501 was subtracted from Fourier transform 601 as shown in FIG. 7 at comparator 701. The resultant output 800 is analyzed in connector evaluation block 720 to determine the performance level of each connector 110, 115, and 120.

With the arrangement shown in FIG. 7, the reflection (i.e., R1, R2, and R3) and transmission (i.e., T1, T2, and T3) coefficients for each of the three connectors 110, 115, and 120 were varied to simulate and illustrate a faulty connection. Referring to FIG. 8, there is shown the resultant output 800 of the comparison of the Fourier transform 501 and Fourier transform 601 of the fiber optic transmission path 100. Waveform 810 represents the output for a simulated high-reflectivity connector 110. Waveform 815 represents the output for a simulated defective or reflective connection at connector 115. Waveform 820 represents the output for a simulated defective or reflective connection at connector 120. As can be seen from FIG. 8, there is an energy peak for each waveform 810, 815, and 820, which occurs at a particular region (frequency offset) for each connector 110, 115, and 120. Thus, once the fiber optic transmission path 100 has been characterized, the amount of energy at a particular frequency has a direct correspondence to the magnitude of the reflection of a particular connector. Thus, in accordance with the principles of the invention, energy peaks at specific frequencies correspond to the reflectivity of a specific connector in the fiber optic transmission path 100 and is used to determine the performance level of the particular connector. If the energy is above a predetermined threshold, then the connector is presumed to be providing a below standard connection. The predetermined threshold or predetermined amounts of energy correspond to maximum acceptable limits as determined for each system under evaluation. The maximum acceptable limits can correspond to a predetermined worst case acceptable performance level for each of the connectors in the fiber optic transmission path.

Figure 9:
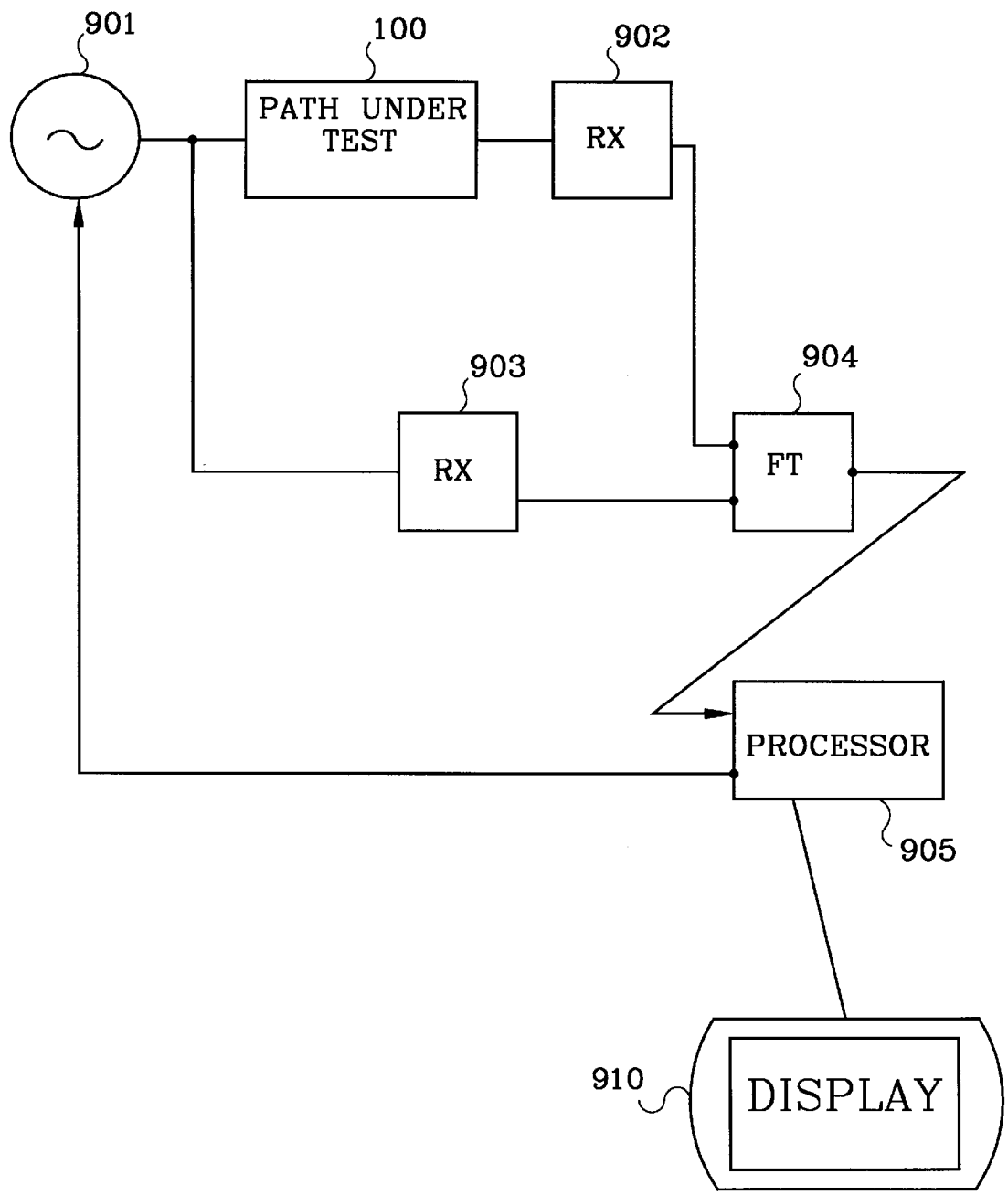
FIG. 9 illustrates a test arrangement in functional block form in accordance with the principles of the present invention.

Referring now to FIG. 9, an exemplary test setup in accordance with the present invention, is shown in block diagram form. FIG. 9 shows an alternate embodiment of the present invention that would function as a piece of test equipment where the performance of the fiber link is displayed to a user for observation rather than logged electronically. In accordance with the test setup, a processor 905 is utilized to control the testing and to provide test analysis. A pulse source 901 (optical source) is connected to the fiber optic transmission path 100 under test. The test source 901 can be of any conventional design that provides a repeatable test pulse to the fiber optic transmission path 100. A fiber optic receiver 902 is connected to the other end of the fiber optic transmission path 100. Similarly, a receiver 903 can be utilized to convert signals from the signal source 901, i.e., to convert light signals to electrical signals. The outputs of receivers 902 and 903 are applied to a Fourier transform analyzer 904. Fourier transform analyzers are commercially available in the marketplace and the one selected for use herein can be any of a number of commercially-available Fourier transform devices. Alternatively, the Fourier transform analyzer 904 can be a processor unit with associated Fourier analysis software and appropriate interfaces to the receivers 902 and 903. The Fourier transform analyzer 904 is utilized to provide an equivalent of the signals 501 and 601 (FIG. 7) to the processor unit 905.

Processor unit 905 can be any conventional processor available in the marketplace. Processor unit 905 can include commercially-available software for performing the summation operation as described above (summation device 710 in FIG. 7). The software utilized in processor 905 can identify peaks in the received waveform and provide a direct correspondence to the connector represented by the peak. The processor 905 includes memory associated therewith, which can be any conventional memory that is commercially available. A conventional display unit 910 is coupled to the processor 905 for alternate uses, such as in a simulation laboratory environment. Display unit 910 can display test results identifying connectors having excessive reflectivity, which indicates a below standard connection.

In operation, the present invention finds particular applicability to the testing of avionics systems. A system that is to be subject to testing can be connected in a test arrangement while the aircraft executes a series of predetermined maneuvers so that the fiber optic system can be operated under various aircraft operating parameters such as altitude, speed, acceleration, pitch, roll, and yaw. By testing the fiber optic system under actual operational conditions of the aircraft, an operational baseline can be established for each fiber optic system. The results of the testing, i.e., the characteristics of the fiber optic transmission path 100 under different conditions, is stored in the memory of processor 905. Also, an indication of the flight parameters is associated with the test results. The system shown in FIG. 9 can then be utilized to test the fiber optic system during operational use of the aircraft. With this arrangement, connector failure or eminent failure can be detected by comparing measured results for a fiber optic transmission path with characteristic results which are the result of prior testing.

Thus, in accordance with the principles of the invention, once a system has been characterized, the testing of that system is straight forward and requires but a single connection to the input of the transmission path to be tested, and a connection to the output of the transmission path.

Other variations and modifications of the present invention will be apparent to those of skill in the art, and it is the intent of the appended claims that such variations and modifications be covered. The particular values and configurations discussed above can be varied and are cited merely to illustrate a particular embodiment of the present invention and are not intended to limit the scope of the invention. It is contemplated that the use of the present invention can involve components having different characteristics as long as the principle, the presentation of comparing a reference Fourier transform of an input signal with a Fourier transform of the output signal to identify location of connectors, is followed. Although the present invention has been discussed in connection with an avionics system as an exemplary application, those skilled in the art will recognize that it can be applied in other areas, such as fiber optic telephone systems, computer network systems, data communication systems, etc. Additionally, the fiber optic path can be of any transmission type such as single-mode or multi-mode and optically transmissive or reflective material such as a step-index glass fiber, a graded-index glass fiber (e.g., germanium-doped silica), plastic fiber, etc. It is intended that the scope of the present invention be defined by the claims appended hereto.

The embodiments of an invention in which an exclusive property or right is claimed are defined as follows:

1. A method of identifying faulty connections in an optical path comprising a plurality of connectors, the method comprising the steps of:

(a) introducing a reference input at a first end of the optical path, the reference input having a time domain expression;

(b) detecting an output at a second end of the optical path, the output having a time domain expression, the output being generated in response to the reference input;

(c) transforming the reference input and the output from the time domain expression to a domain that is a function of time to obtain a transformed reference input and a transformed output;

(d) combining the transformed reference input and the transformed output to produce a resultant signal;

(e) identifying specific parameters in the resultant signal that are indicative of and have a correspondence to a specific connector of the plurality of connectors; and (f) determining a condition of each specific connector from amounts of energy in a particular region in the resultant signal to determine whether any faulty connections exist.

2. A method in accordance with claim 1, wherein the optical path is in operation in an avionics system.

3. A method in accordance with claim 1, wherein the optical path comprises an optical fiber.

4. The method of claim 1, wherein the step of transforming is conducted using Fourier transform processes.

5. A method in accordance with claim 1, wherein the particular regions are specific frequency bands.

6. A method in accordance with claim 1, further comprising the step of:

(g) comparing the amounts of energy to predetermined amounts of energy to determine the operability of the plurality of connectors.

7. A method in accordance with claim 6, wherein the predetermined amounts of energy correspond to maximum acceptable limits.

8. A method in accordance with claim 7, wherein the maximum acceptable limits correspond to a predetermined worst case acceptable performance level for each specific connector of the plurality of connectors.

9. A method in accordance with claim 1, wherein the condition is the reflectivity of each specific connector of the plurality of connectors.

10. A method in accordance with claim 9, further comprising the step of:

(h) identifying whether any of specific connectors of the plurality of connectors has a predetermined undesirable level of reflectivity.

11. A method in accordance with claim 1, comprising:
performing steps (a) through (f) while subjecting the optical path to mechanical stresses.

12. A method in accordance with claim 1, comprising:
performing steps (a) through (f) while subjecting the optical path to environmental stresses.

13. A method in accordance with claim 1, wherein step (f) comprises the step of comparing the amounts of energy in the particular region in the resultant signal with predetermined characteristic amounts of energy.

14. A method in accordance with claim 13, wherein the predetermined characteristic amounts of energies are determined by performing steps (a) through (e) on an acceptable baseline optical path system.

15. A method in accordance with claim 1, wherein step (d) includes subtracting the transformed reference input from the transformed output.

16. A method for identifying faulty connections in a fiber optic path comprising a plurality of connectors, the fiber optic path being installed in an avionics system, the method comprising the steps of:

(a) performing characterizing tests on the fiber optic path by:

(1) applying a first signal to a first end of the fiber optic path;

(2) receiving an output signal from a second end of the fiber optic path, the output signal being generated in response to the first signal;

(3) combining a frequency domain expression of the first signal and a frequency domain expression of the output signal to produce a first resultant signal;

(4) identifying specific frequencies in the first resultant signal having a correspondence to specific connectors of the plurality of connectors;

(5) determining a characteristic condition of each of the plurality of connectors from amounts of energy at each of the specific frequencies to determine characterizing amounts of energy; and (6) performing all of steps (1) through (5) while subjecting the fiber optic path to a predetermined mechanical stress;

(b) applying a test pulse to the first end of the fiber optic path;

(c) receiving an output pulse from the second end of the fiber optic path, the output pulse being generated in response to the test pulse;

(d) combining a frequency domain expression of the test pulse and a frequency domain expression of the output pulse to produce a resultant pulse;

(e) identifying specific frequencies in the resultant pulse having a correspondence to specific connectors of the plurality of connectors; and (f) determining a condition of each of the plurality of connectors from amounts of energy at each of the specific frequencies and comparing the amounts of energy to the characterizing amounts of energy.

17. A method of identifying faulty connections in an optical path system, the optical path system having a memory for storing parameters, the optical path system comprising at least one optical path, the optical path comprising a plurality of connectors, the optical path system having predetermined characterization parameters, the characterization parameters being stored in and accessible from the memory, the characterization parameters including a finite number of connectors, a distance between each of the connectors, and a nominal performance level of the connectors, the method comprising the steps of:

(a) introducing a reference input at a first end of the optical path;

(b) detecting an output at a second end of the optical path, the output being generated in response to the reference input;

(c) combining a transform of the reference input and a transform of the output to produce a resultant signal;

(d) identifying specific parameters in the resultant signal that are indicative of and have a correspondence to a specific connector of the plurality of connectors;

(e) determining a condition of each specific connectors from amounts of energy at each of the specific parameters to determine whether any faulty connections exist; and (f) displaying the condition to a user of the optical path system.

18. A method of identifying faulty connections in an optical path comprising a plurality of connectors, the method comprising the steps of:

(a) introducing a reference input at a first end of the optical path;

(b) detecting an output at a second end of the optical path, the output being generated in response to the reference input;

(c) converting the reference input to a converted input and the output to a converted output, the converted input and converted output being representative of another domain for signal analysis;

(d) combining the converted input and the converted output to produce a resultant signal;

(e) identifying specific parameters in the resultant signal that are indicative of and have a correspondence to a specific connector of the plurality of connectors; and (f) determining a condition of each specific connectors from amounts of energy at each of the specific parameters to determine whether any faulty connections exist.

19. A system for identifying faulty connections in an optical path comprising a plurality of connectors, the system comprising:

means for introducing a reference input at a first end of the optical path;

means for detecting an output at a second end of the optical path, the output being generated in response to the reference input;

means for combining a transform of the reference input and a transform of the output to produce a resultant signal;

means for identifying specific parameters in the resultant signal that are indicative of and have a correspondence each specific connector of the plurality of connectors; and means for determining a condition of each of the plurality of connectors from amounts of energy at each of the specific parameters to determine whether the faulty connections exist.

20. The system of claim 19, wherein the means for combining a transform of the reference input and a transform of the output includes means for producing a frequency domain transform of the reference input and the output.

21. The system of claim 19, wherein the means for combining, the means for identifying specific parameters in the resultant signal, and the means for determining a condition are a spectrum analyzer.

* * * * *